United States Patent
Li

(10) Patent No.: US 11,061,884 B2
(45) Date of Patent: Jul. 13, 2021

(54) METHOD AND SYSTEM TO ACCELERATE TRANSACTION COMMIT USING NON-VOLATILE MEMORY

(71) Applicant: ORACLE INTERNATIONAL CORPORATION, Redwood Shores, CA (US)

(72) Inventor: Yunrui Li, Los Altos, CA (US)

(73) Assignee: Oracle International Corporation, Redwood Shores (CA)

(*) Notice: Subject to any disclaimer, the term of this patent is extended or adjusted under 35 U.S.C. 154(b) by 198 days.

(21) Appl. No.: 16/163,181

(22) Filed: Oct. 17, 2018

(65) Prior Publication Data

US 2020/0125656 A1   Apr. 23, 2020

(51) Int. Cl.
  *G06F 11/00* (2006.01)
  *G06F 16/23* (2019.01)
  *G06F 11/14* (2006.01)
  *G06F 12/0804* (2016.01)

(52) U.S. Cl.
  CPC ...... *G06F 16/2358* (2019.01); *G06F 11/1451* (2013.01); *G06F 11/1469* (2013.01); *G06F 12/0804* (2013.01); *G06F 2201/82* (2013.01); *G06F 2212/1032* (2013.01)

(58) Field of Classification Search
  CPC ............. G06F 16/2358; G06F 11/1461; G06F 11/1451; G06F 11/1469; G06F 12/0804
  See application file for complete search history.

(56) References Cited

U.S. PATENT DOCUMENTS

| | | | |
|---|---|---|---|
| 6,976,022 B2 | 12/2005 | Vemuri et al. | |
| 7,373,438 B1* | 5/2008 | DeBergalis | G06F 3/0611 707/999.001 |
| 8,984,170 B2 | 3/2015 | Colrain et al. | |
| 9,558,229 B2* | 1/2017 | Lee | G06F 9/466 |
| 10,387,399 B1* | 8/2019 | McKelvie | G06F 16/2358 |
| 2016/0344834 A1* | 11/2016 | Das | G06F 11/3476 |
| 2016/0350353 A1 | 12/2016 | Li | |

* cited by examiner

*Primary Examiner* — Philip Guyton
(74) *Attorney, Agent, or Firm* — Vista IP Law Group, LLP

(57) ABSTRACT

Described is an improved approach to implement parallel queries where session states are saved for parallelization resources. When work needs to be performed in the parallel query system for a given session, a search can be performed to identify a resource (from among the pool of available resources) that had previously been used by that session, and which had saved a session state object for that previous connection to the session. Instead of incurring the entirety of setup costs each time workload is assigned to a resource, the saved session state can be used to re-set the context for the resource to the configuration requirements for that session.

17 Claims, 7 Drawing Sheets

METHOD AND SYSTEM TO ACCELERATE TRANSACTION COMMIT USING NON-VOLATILE MEMORY

BACKGROUND

Database applications interact with a database server by submitting commands that cause the database server to perform operations on data stored in a database. For the database server to process the commands, the commands typically conform to a database language supported by the database server. An example of a commonly used database language supported by many database servers is known as the Structured Query Language (SQL).

When a database server receives the original statement of a database command from a database application, the database server must first determine which actions should be performed in response to the database command, and then perform those actions. The act of preparing for performance of those actions is generally referred to as "compiling" the database command, while performing those actions is generally referred to as "executing" the database command.

A database "transaction" corresponds to a unit of activity performed at the database that may include any number of different statements or commands for execution. ACID (Atomicity, Consistency, Isolation, Durability) is a set of properties that guarantees that database transactions are processed reliably. Atomicity requires that each transaction is all or nothing; if any part of the transaction fails, then the database state should not be changed by the transaction. Consistency requires that a database remains in a consistent state before and after a transaction. Isolation requires that other operations cannot see the database in an intermediate state caused by the processing of a current transaction that has not yet committed. Durability requires that, once a transaction is committed, the transaction will persist.

Write-ahead logging is used to record all modifications performed on the database before they are applied. No changes are made to the database before the modifications are recorded. Furthermore, no transaction is acknowledged as committed until all the modifications generated by the transaction or depended on by the transaction are recorded. In this manner, write-ahead logging ensures atomicity and durability.

In one approach, the modifications are recorded as change records, which may be referred to herein as "redo" records. The change records are generated in-memory by a process executing a transaction, and are copied into one or more in-memory change log buffers. Multiple processes executing transactions may concurrently generate the change records into corresponding change log buffers. One or more writer processes gather the change records from the in-memory change log buffers and write them out to a persistent change log file on disk. The change records are cleared from the in-memory change log buffers after they are persisted to disk. When a writer process gathers change records from a particular region of an in-memory change log buffer, it needs to wait for and synchronize with activity from any process that is writing into the same region.

When a transaction commits, because write-ahead logging requires the change records to be persisted before applying the corresponding changes to the database, the writer process must write any remaining change records for the transaction from the corresponding in-memory change log buffer to the persistent change log file. A commit change record is also generated to indicate the end of the transaction.

During the commit procedure, the process executing the transaction needs to wait for a writer process to gather and write the corresponding commit change record to the persistent change log file. The process executing the transaction must also wait for the writer process to gather and write other change records for the transaction. If the transaction depends on other transactions, the writer process must also gather and write the change records of the other transactions. Furthermore, the writer process must wait for any other process that is modifying a corresponding regions of the in-memory change log buffer. Collectively, these delays during transaction commit is referred to as a log file synchronization delay. Log file synchronization delay is one of the top delays in many OLTP (online transaction processing) workloads. The physical disk I/O performed by the writer process is a major time component of performing the commit operation. Log file synchronization delay is increased when, to achieve maximum concurrency across multiple concurrent database transactions, writing to the change log file is synchronized. Change records for the multiple transactions may be copied into multiple in-memory change log buffers concurrently to reduce contention. One writer process synchronizes the copying from multiple change log buffers into the persistent change log file. Thus, when one transaction commits, the log file synchronization delay may involve waiting for ongoing change record generation into multiple regions of one or more change log buffers to finish, even if the region is not related to the committing transaction.

To address this issue, approaches have been proposed to store the log files in non-volatile memory. Non-volatile memory refers to a type of computer memory which can hold information even after power has been shut down to the memory. This is in contrast to volatile memory, where the contents of the volatile memory is lost when the computer is shut down or loses power. For example, one possible approach is to simply place log files within non-volatile memory. While this approach may reduce the I/O time to write to the log file, since this approach does not change the existing log writing model that uses log buffers in volatile memory, this means that the issue of log file synchronization delay is still present. Therefore, this simplistic scheme does not remove the delays associated with log file synchronization wait at transaction commit time. Another possible approach is to completely change the log writing model so that the entirety of the log buffers exist in non-volatile memory and therefore there is no longer the need to have a redo log buffer in volatile memory. This approach reduces the log file synchronization delay involved in writing to persistent storage. However, this approach is costly in implementation since it requires the work to implement a wholesale change to the existing code paths that rely upon current log writing models that write to volatile memory.

What is needed, therefore, is a method and/or system that overcomes these problems, and which more efficiently implements log writing and transaction commits in a database system.

SUMMARY

According to some embodiments, a system, method, and computer program product is provided that uses non-volatile memory to hold change records for databases. In this way, commits can occur once the appropriate redo records for a given transaction have been placed into the buffer(s) of the non-volatile memory, without having to wait for the records to be persisted to disk. The non-volatile memory is used as a side buffer in a coordinated manner with change log buffers in volatile memory, which means that the non-volatile memory can operate in conjunction with existing logic for processing redo logs from the conventional log buffers in volatile memory.

Other additional objects, features, and advantages of the invention are described in the detailed description, figures, and claims.

BRIEF DESCRIPTION OF FIGURES

The drawings illustrate the design and utility of some embodiments of the present invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments will now be described in detail, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Embodiments of the invention provide an improved approach to use non-volatile memory (NVM) as a mechanism to hold change records for databases. In particular, the non-volatile memory is used as a side buffer in a coordinated manner with change log buffers in volatile memory (VM) that would otherwise already exist for conventional log writing models. In this way, commits can occur once the appropriate redo records for a given transaction have been placed into the buffer(s) of the non-volatile memory—without waiting for the records to be persisted to disk. This approach therefore reduces the log file synchronization delay involved in writing to persistent storage. However, since the non-volatile memory is merely acting as a side buffer to the existing log buffers in volatile memory, this means that the non-volatile memory can operate in conjunction with existing logic for processing redo logs from the conventional log buffers in volatile memory.

Figure 1:
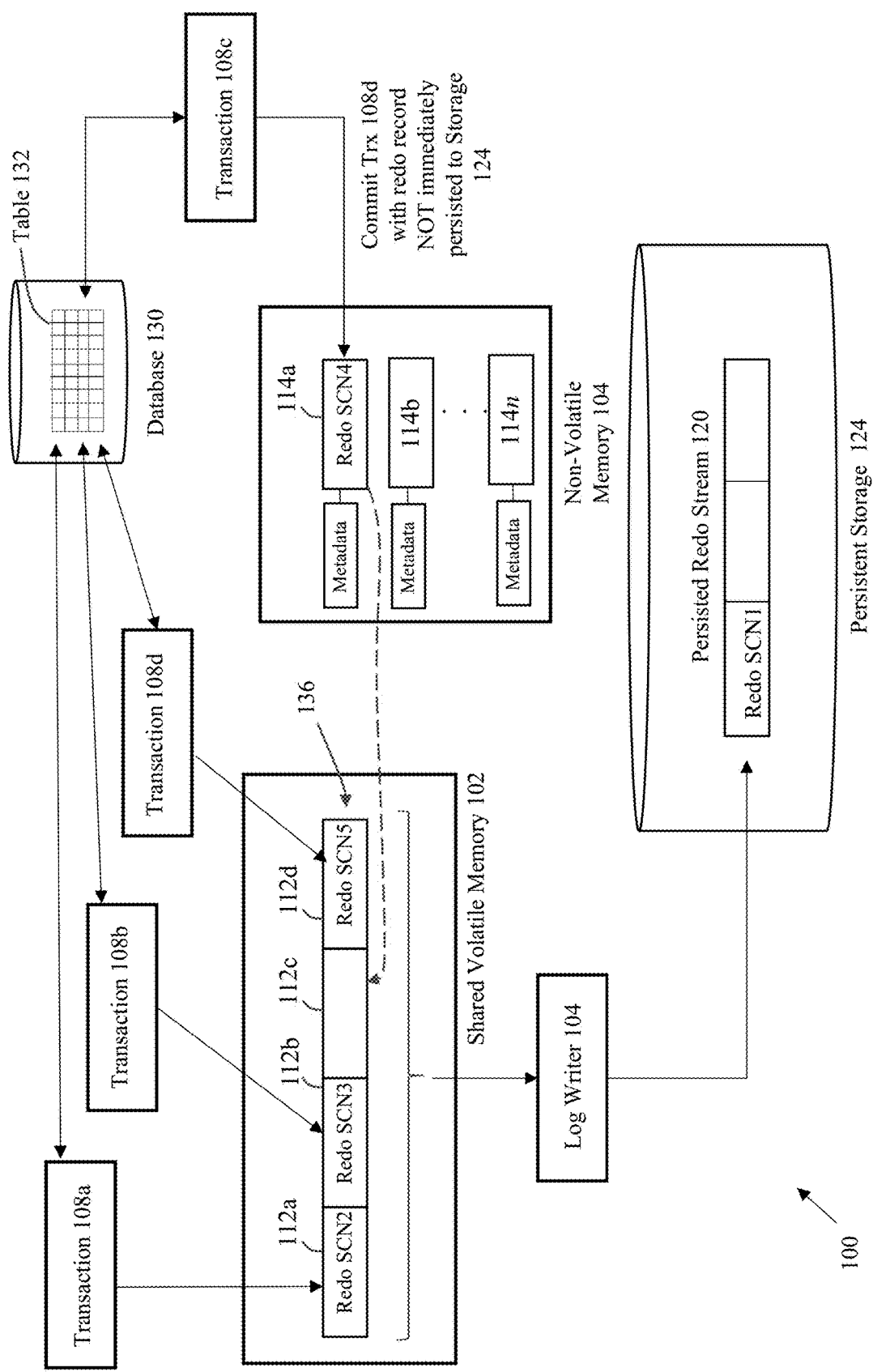
FIG. 1 illustrates a system for implementing some embodiments of the invention having non-volatile memory (s) as a side buffer for holding change records.

FIG. 1 illustrates a system 100 for implementing some embodiments of the invention having non-volatile memory(s) 104 as a side buffer for holding change records. Any suitable type of non-volatile memory may be employed in embodiments of the invention. As a non-limiting example, the non-volatile memory 104 may be implemented using a ferroelectric random access memory (FRAM or FeRAM), where the RAM component includes a ferroelectric film that helps the device to retain data memory when power is shut off. Another non-limiting example of a non-volatile memory is a magnetoresistive RAM (MRAM) that uses magnetic storage elements to hold data in a non-volatile and persistent manner.

System 100 includes a database 130 having one or more tables 132 that are operated upon by one or more clients within the system. One or more users at the clients operate a user station to issue SQL commands to be processed by the database 130 upon the table 132. The user stations and/or the servers that host the database comprises any type of computing device that may be used to implement, operate, or interface with the database system 100. Examples of such devices include, for example, workstations, personal computers, mobile devices, servers, hosts, nodes, or remote computing terminals. The user station comprises a display device, such as a display monitor, for displaying a user interface to users at the user station. The user station also comprises one or more input devices for the user to provide operational control over the activities of the system 100, such as a mouse or keyboard to manipulate a pointing object in a graphical user interface to generate user inputs.

Transaction log records are maintained to allow suitable recovery operations in the event of a system failure or aborted transaction. Some common problems that could cause a system failure or aborted transaction include hardware failure, network failure, power failure, database instance failure, data access conflicts, user errors, and statement failures in the database access programs (most often written in the structured query language or SQL). Different types of transaction log records can be maintained in a database system. A common transaction logging strategy is to maintain redo records that log all changes made to the database. With "write ahead logging", each change to data is first recorded in the redo log, and only afterwards is that change actually made to the database block corresponding to the changed data. This protects against the situation when a system failure occurs and the version of the database data that is immediately restored from disk does not accurately reflect the most recent state of the database. This may occur because of changes to the data that has only occurred in cache, and have not been recorded to disk before the failure. If redo log have been properly maintained for these cache-only changes, then recovery can be performed by applying the redo records to roll the database forward until it is consistent with the state that existed just before the system failure.

In system 100, redo log records may be located in both volatile memory 102 and non-volatile memory 104. The volatile memory 102 holds the main change log buffers 136 that would otherwise exist in conventional log writing models. The non-volatile memory 104 is used as a side buffer in conjunction with the main change log buffers 136 in the volatile memory 102.

In operation, multiple transactions may operate upon one or more tables 132 within database 130. Certain of the transactions may generate redo records that are placed within log buffer 136 within the shared volatile memory 102. This figure illustratively shows transaction 108a generating a redo record that is placed at buffer location 112a, transaction 108b generating a redo record that is placed at buffer location 112b, and transaction 108d generating a redo record that is placed at buffer location 112d.

For transactions 108a, 108b, and 108d, these transactions cannot be committed until their associated redo records have been durably stored within persistent storage 124. The reason for this is because the redo records for these transactions 108a, 108b, and 108d are initially placed into buffer locations 112a, 112b, and 112d, respectively, which are located in volatile memory 102. Since volatile memory 102 is "volatile", this means that a failure of a computing node may cause loss of the data within volatile memory 102 hosted by that computing node, including loss of the redo log records within that memory. Therefore, in the case of write-ahead logging, failure to persist those redo records prior to commit may cause permanent loss of data and inconsistent data states since the data changes represented by the lost redo records do not exist in blocks on disk and therefore may be unrecoverable if the redo records themselves are lost (e.g., by failure or shutdown of either the volatile memory 102 or the host computer for that memory).

To address this issue, a log writer 104 is instructed to write redo records from the log buffer 136 from the volatile memory 102 into a persisted redo stream 120 in a persistent storage device 124. In particular, prior to a transaction being allowed to commit, the redo records associated with that transaction are written by the log writer 104 to the persistent storage 124. In this way, if a failure later occurs, the redo records in the redo stream 120 within persistent storage 124 can be accessed to restore the database to an appropriate state consistent with previously-committed transactions.

The problem with this sequence of actions is the delay associated with the process to write the redo records to the persistent storage 124. This log synchronization delay stalls a transaction commit until confirmation is received that the transaction's redo records have been persisted to the persistent storage 124.

With embodiments of the invention, a non-volatile memory 104 is used as a side buffer to hold redo records in conjunction with the main log buffer 136 in the volatile memory 102. The non-volatile memory 104 holds a set of private strands 114a-114n. Each of the private strands corresponds to a private memory buffer that is used by a transaction to hold its redo records.

When a transaction 108c seeks to use the non-volatile memory, one of the private strands 114a is assigned to that transaction 108c. As that transaction 108c processes operations against table 132 in database 130, its redo records are placed into the private strand 114a in the non-volatile memory 104.

When transaction 108c seeks to commit, a log synchronization delay does not need to be incurred. This is because the redo records for transaction 108c are located in non-volatile memory 104 and therefore will not be lost if the computing node or the memory device fails or loses power. As such, transaction 108c does not need to wait for a copy of the redo records in strand 114a to be copied into persistent storage 124 prior to commit. This significantly reduces the latency to process workloads that employ the non-volatile memory 104.

However, in some embodiments when a subsequent transaction 108d commits, the redo record in 114a can be copied into volatile memory 102. In particular, even though the redo record is already located in 114a in a side buffer of the non-volatile memory 104, the in-memory redo stream in volatile memory 102 can nonetheless include a location 112c for that redo record, so that when a later operation occurs that will add a subsequent redo record, the subsequent redo record will then be added at location 112d. This placeholder allows the rest of the system to know about the sequential existence of the redo records even if they exist in the side buffer, and to allow integration the side buffers of the non-volatile memory 104 with the main log buffer 136 of the volatile memory 102 upon the subsequent commit. As such, when the log records in shared volatile memory 102 are flushed for a commit by transaction 108c, all log records depended upon through the SCN of that committed transaction can be copied in a persistent manner to the persistent storage 124. This approach therefore provides an effective integration of the side buffer of the non-volatile memory 104 with the standard processing of the main log buffer 136 of the volatile memory 102.

Any suitable approach can be taken to determine which transactions are assigned to use the non-volatile memory and which transactions are assigned to use the volatile memory. For example, one approach is to simply assign the available non-volatile memory until it runs out, and then assign transactions to volatile memory. Alternatively, transactions which are higher in importance and/or which are particularly sensitive to latency on commit can be identified to write their redo directly to non-volatile memory, while other less important, less latency-sensitive transactions, or ordinary transaction by default are identified to be assigned to the volatile memory.

Figure 2:
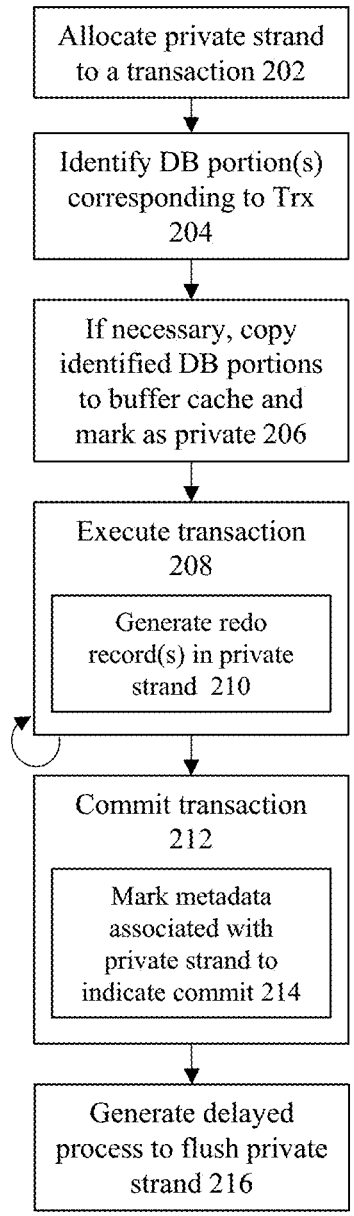
FIG. 2 shows a flowchart of an approach to implement some embodiments of the invention.

FIG. 2 shows a flowchart of an approach to implement some embodiments of the invention. At 202, a private strand within the non-volatile memory is allocated to a transaction. The private strands are pre-designated buffer locations within the non-volatile memory that are assigned upon request to specific transactions. Each private strand is associated with metadata that is also persistently stored, e.g., in the non-volatile memory. The metadata associated with each private strand is marked to provide information as to whether the private strand is bound by a transaction, and if so, is marked to include the identifier of the transaction and whether the transaction is committed.

The physical location of the non-volatile memory that stores the private strands and their associated metadata are stored in a known persistent location. This persistent storage of the strand locations means that, after a failure, the system can later know exactly where to look for redo records that may need to be applied.

At 204, identification is made of the portion(s) of the database that correspond to the transaction being operated upon. For example, this step may identify specific row(s) within one or more database tables that need to be accessed and/or modified by the transaction.

If necessary, then at 206, the identified portions of the database are copied into a buffer cache. This step may not be necessary if a previous transaction has already copied the relevant portions of the database into the buffer cache. Once the identified portions are in the buffer cache, they will then be marked as private. This permits the transaction to perform operations upon the copy of data in the buffer cache that is private to that transaction, and not the actual data block(s) for that data on disk. An example approach to implement operations upon data in a buffer cache that is private to a transaction is disclosed in U.S. Pat. No. 6,976,022, which is hereby incorporated by reference in its entirety.

At 208, the transaction is now executed against the identified data. Any suitable operations may be performed as part of the transaction execution. For example, the transaction may add data, modify data, and/or delete data within a database table. Regardless of the specific changes caused by the transaction, at 210, redo records are generated that correspond to those changes. The redo records are placed into the private strand in the non-volatile memory.

At a later point in time, at 212, the transaction may seek to commit and make its changes permanent. Since the redo records for the transaction are already in a persistent state because they are stored in non-volatile memory, the commit may take place once the metadata associated with the private strand is, at 214, marked appropriately to indicate the transaction commitment. The metadata associated with each private strand is tagged with the corresponding database ID, resetlogs information, thread number and sequence number, so that in case database is restored to a different point in time, the mismatch can be detected. In some embodiments, the metadata is persistently marked to indicate that redo generation for the transaction is finished and the transaction is acknowledged as committed.

The transaction commit can take place even without the redo records in the private strand being copied to the persistent redo stream on disk. Instead, at 216, a later procedure is implemented to copy the redo records in the private strand to the log buffer. In particular, the transaction commit signals a background process to copy the redo in the private strand in a delayed fashion to the log buffer after the commit has already occurred. After the redo records have been copied to the log buffer, the private strand can be freed so that it can be used for subsequent transactions. In an alternate embodiment, the redo record is copied directly from the non-volatile memory into the persistent storage—without first being transitorily copied to the volatile memory.

In this way, transactions that use the private strands in the non-volatile memory can avoid excessive commit-time latencies caused by log file synchronization delays, since redo records no longer need to incur the wait to be copied to disk to effect a transaction commit. However, since this approach uses the non-volatile memory as a side buffer, all other existing code paths that operate with buffers in shared volatile memory can continue to operate as they do for existing log-handling models. For example, existing approaches to flush redo in volatile memory (e.g., due to a query seeing a private buffer) can continue to flush private strands as they do today.

A potential problem arises if the transaction to be committed is dependent upon other uncommitted transactions whose redo records have not yet been flushed to disk. Even if the redo records for a first transaction to be committed are located in non-volatile memory, it is possible that the changes made by the first transaction are assuming the existence of earlier changes made by a second un-committed transaction where the redo records for that second transaction only exist in the change buffers in volatile memory. In this situation, it is not possible to simply assume that it is safe to commit the first transaction merely because the first transaction's redo records are located in non-volatile memory, since a node failure could result in the loss of the redo records in volatile memory for the second transaction that are depended upon by the first transaction. This type of loss of dependency redo records could result in dangerous inconsistencies for the state of the database.

Figure 3:
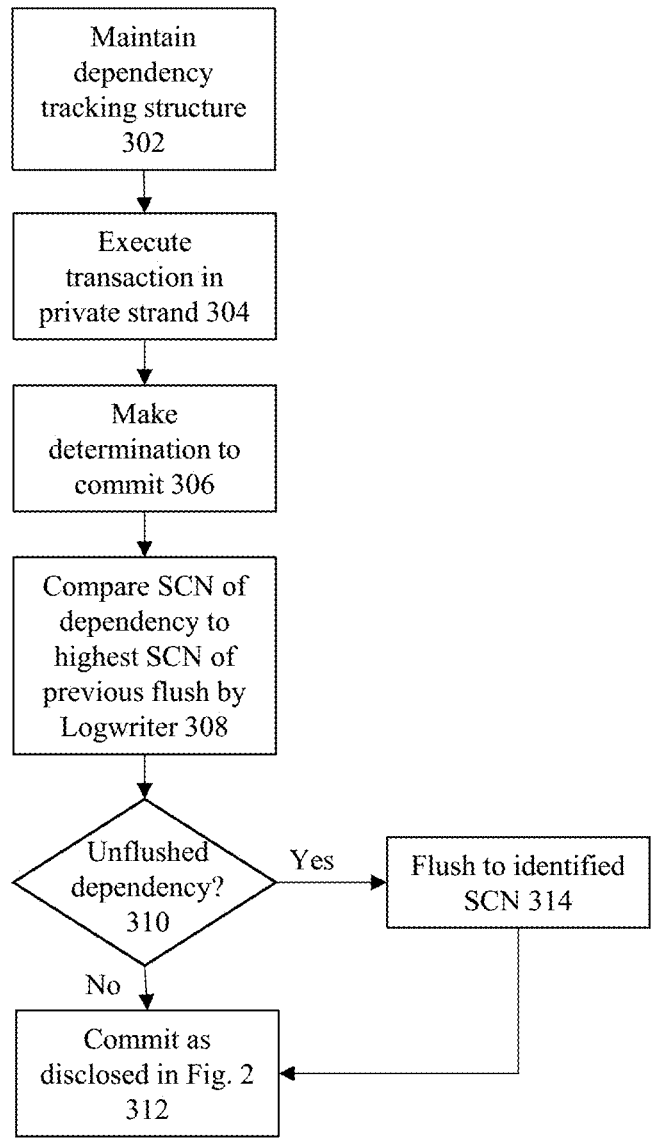
FIG. 3 shows a flowchart of an approach to implement some embodiments of the invention that track transaction dependencies.
Figure 4:
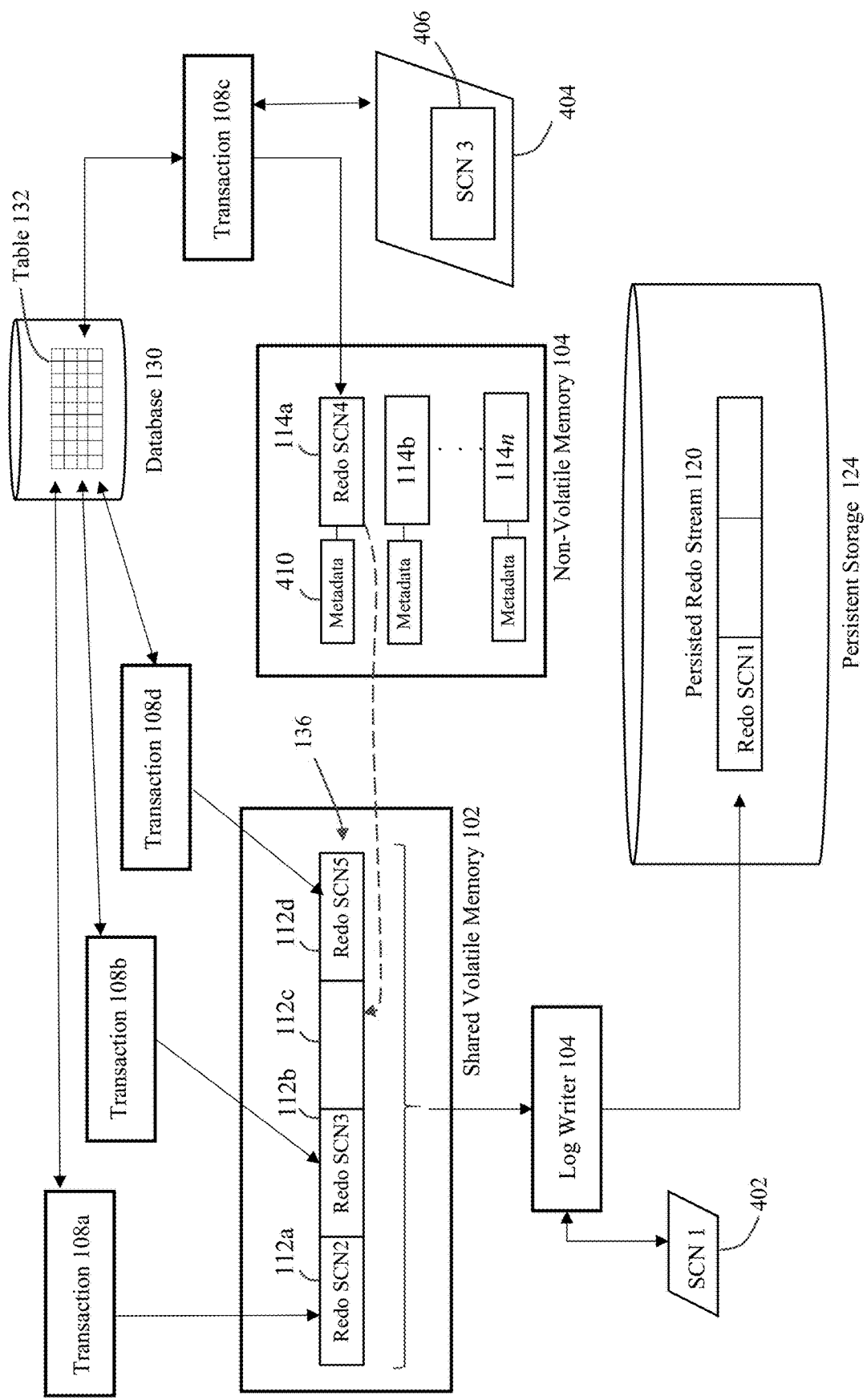
FIG. 4 illustrates a system for implementing some embodiments of the invention that track transaction dependencies.

FIG. 3 shows a flowchart of an approach to address this problem. At 302, a dependency tracking structure is maintained for a transaction of interest. The dependency tracking structure includes information about any dependencies that are associated with the transaction. To explain, consider the system illustrated in FIG. 4. Here, the transaction 108c is associated with a dependency structure 404. Dependency structure 404 includes one or more entries that identify the dependencies associated with transaction 108c. The dependency being identified may be expressed in any suitable type of data format or content. In some embodiments, the identified dependency may be expressed as a "system commit number" or "system change number" (collectively referred to as a SCN), which is a monotonically increasing number that uniquely identifies and is associated with each of the sequence of changes that occur in the system. In the example of FIG. 4, dependency structure 404 includes entry 406 that identifies a dependency for transaction 108c upon any changes made through SCN 3.

At step 304 of FIG. 3, the transaction is executed using the private strand in the non-volatile memory. As illustrated in FIG. 4, private strand 114a in the non-volatile memory 104 is allocated to transaction 108c. As transaction 108c is being executed, the redo records associated with the execution of this transaction are placed into private strand 114a.

At step 306 of FIG. 3, a determination is made to commit the transaction. In the example of FIG. 4, this means that transaction 108c has finished execution and is ready to commit its changes, e.g., to make the changes made by this transaction permanent.

To address the above-identified dependency problem, before committing the transaction, step 308 will compare the SCN of the transaction dependency to the highest SCN of the previous redo flushes made by the log writer 104. At step 310, a determination is made whether there are any unflushed dependencies for the transaction. If not, then the transaction can immediately commit at 312. However, if there are any unflushed dependencies (e.g., redo records having earlier SCN values which have not yet been persisted to disk), then at 314, the redo records for the dependencies must be flushed to persistent storage prior to transaction commit.

As shown in FIG. 4, a tracking structure 402 is maintained that tracks the highest SCN number for the redo records that were previously flushed to disk by the log writer. In this illustrative example, the highest SCN is "SCN 1" for the redo records that had been previously copied by the log writer from volatile memory 102 to the on-disk redo stream 120 in the persistent storage 124. However, as shown in dependency tracking structure 404, the transaction 108c to be committed has a dependency to SCN 3. This means that there is a gap in the redo records that the transaction 108c is dependent upon as compared to the redo records that have been previous copied to persistent storage 124. Therefore, transaction 108c cannot immediately commit.

In one embodiment, to address the dependency problem, the log writer 104 will flush the redo records up to the required dependency SCN level. Here, the dependency tracking structure 404 indicates that transaction 108c has a dependency through SCN 3. Therefore, log writer 104 will flush redo records in buffers 112a and 112b to the persistent storage, since these two buffers include the as-yet unflushed redo records for SCN 2 and SCN 3, respectively, which are the redo records that are currently unflushed that extend from the high SCN water mark of the previous flushes (SCN 1 as shown in flush tracking structure 402) through to the required dependency SCN for the transaction to commit (SCN 3 as shown in dependency tracking structure 404). Once these redo records have been flushed to disk, the transaction 108c can immediately commit, with the appropriate commit indication being marked in metadata 410 associated with private strand 114a.

Figure 5:
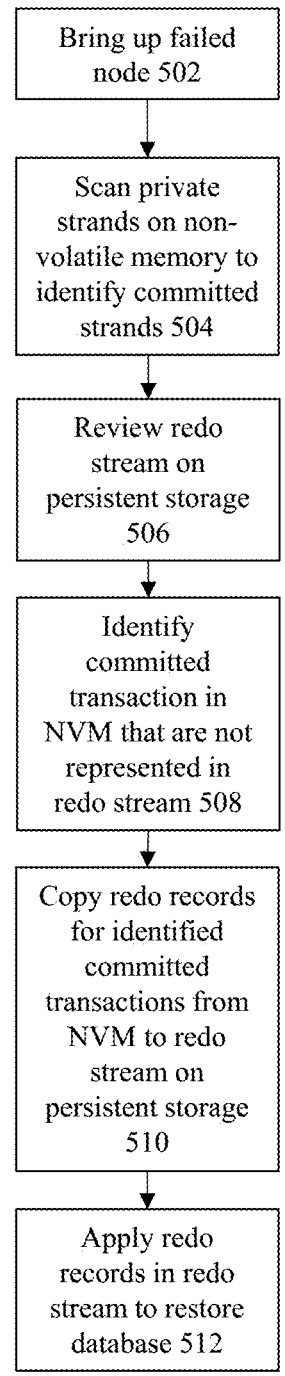
FIG. 5 shows a flowchart of an approach to implement recovery after a failure occurs.

FIG. 5 shows a flowchart of an approach to implement recovery after a failure occurs. At 502, the failed node is eventually brought back up. This may result, for example, from a restart or reboot of one or more applications on a given node, and/or restart or reboot of the entire node. At 504, a scan is made of the private strands in the non-volatile memory. Recall that the private strands are all at known pre-allocated locations within the non-volatile memory. Each of the private strands, and/or their associated metadata, are scanned to identify any private strands that are marked as being associated with a committed transaction.

At 506, a review is made of the redo stream on the persistent storage. In one embodiment, this action identifies the highest SCN of the redo records that were copied to disk prior to the system failure.

Next, at 508, a determination is made whether there are any redo records for committed transactions that exist in the private strands of the non-volatile memory which had not been copied to disk prior to the failure. This comparison can be made by checking the highest SCN of the redo records on disk against the SCN numbers of the committed transactions in the private strands of the non-volatile memory.

If any discrepancy exists between the on-disk redo stream and the redo records for committed transactions in the non-volatile memory, then at 510, the identified redo records in the private strands for the committed transactions are flushed to the on-disk redo stream. In effect, this allows the system to "pretend" that the redo records had actually been flushed prior to the system failure. At this point at step 512, since the on-disk redo stream should now be complete with its representation of committed transactions, the database system can now apply the redo stream on disk to restore the system to a consistent pre-crash state.

Therefore, what has been described is an improved approach to use non-volatile memory (NVM) as a mechanism to hold change records for databases. The functioning of the computing itself is improved, since processing latencies are reduced by allowing commits to occur immediately once the appropriate redo records for a given transaction have been placed into the buffer(s) of the non-volatile memory without waiting for the records to be persisted to disk. This approach therefore reduces the log file synchronization delay involved in writing to persistent storage. Since the non-volatile memory is merely acting as a side buffer to the existing log buffers in volatile memory, this means that the non-volatile memory can operate in conjunction with existing logic for processing redo logs from the conventional log buffers in volatile memory and thus does not does require a change to existing redo formats in online log/archive logs.

System Architecture Overview

Figure 6:
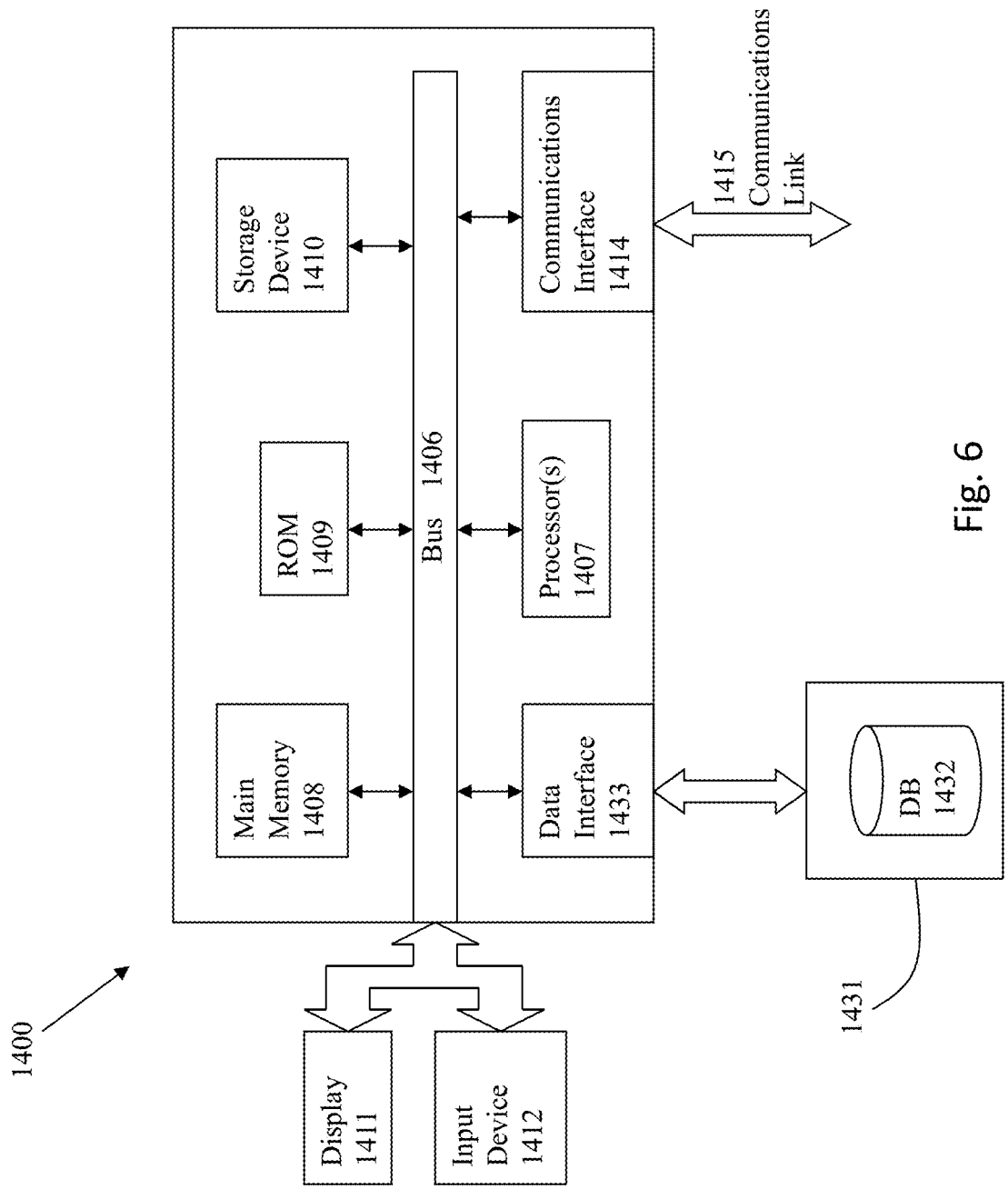
FIG. 6 is a block diagram of an illustrative computing system suitable for implementing an embodiment of the present invention.

FIG. 6 is a block diagram of an illustrative computing system 1400 suitable for implementing an embodiment of the present invention. Computer system 1400 includes a bus 1406 or other communication mechanism for communicating information, which interconnects subsystems and devices, such as processor 1407, system memory 1408 (e.g., RAM), static storage device 1409 (e.g., ROM), disk drive 1410 (e.g., magnetic or optical), communication interface 1414 (e.g., modem or Ethernet card), display 1411 (e.g., CRT or LCD), input device 1412 (e.g., keyboard), and cursor control.

According to one embodiment of the invention, computer system 1400 performs specific operations by processor 1407 executing one or more sequences of one or more instructions contained in system memory 1408. Such instructions may be read into system memory 1408 from another computer readable/usable medium, such as static storage device 1409 or disk drive 1410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

The term "computer readable medium" or "computer usable medium" as used herein refers to any medium that participates in providing instructions to processor 1407 for execution. Such a medium may take many forms, including but not limited to, non-volatile media and volatile media. Non-volatile media includes, for example, optical or magnetic disks, such as disk drive 1410. Volatile media includes dynamic memory, such as system memory 1408.

Common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, cloud-based storage, or any other medium from which a computer can read.

In an embodiment of the invention, execution of the sequences of instructions to practice the invention is performed by a single computer system 1400. According to other embodiments of the invention, two or more computer systems 1400 coupled by communication link 1415 (e.g., LAN, PTSN, or wireless network) may perform the sequence of instructions required to practice the invention in coordination with one another.

Computer system 1400 may transmit and receive messages, data, and instructions, including program, i.e., application code, through communication link 1415 and communication interface 1414. Received program code may be executed by processor 1407 as it is received, and/or stored in disk drive 1410, or other non-volatile storage for later execution. Data may be accessed from a database 1432 that is maintained in a storage device 1431, which is accessed using data interface 1433.

Figure 7:
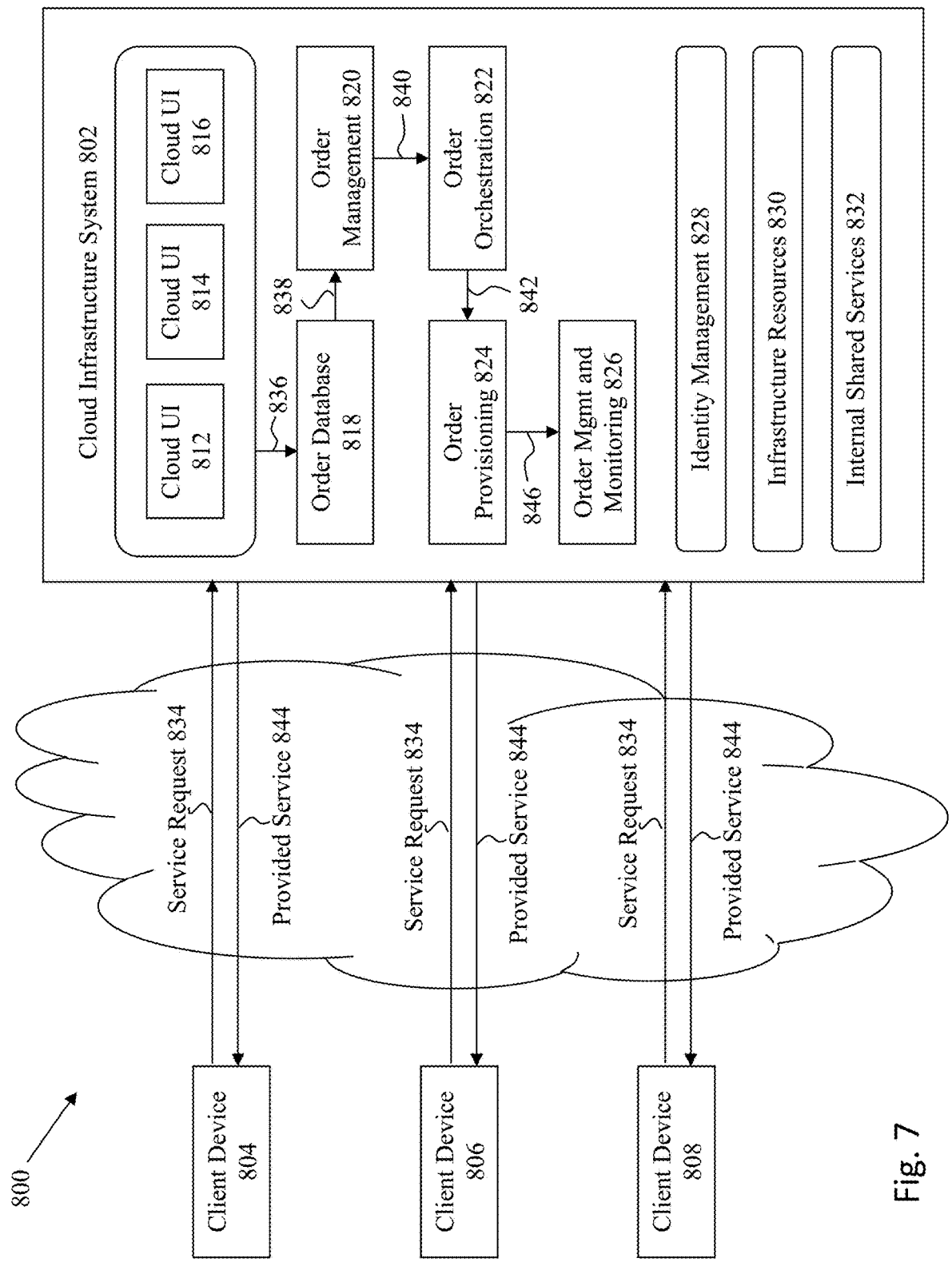
FIG. 7 is a block diagram of one or more components of a system environment in which services may be offered as cloud services, in accordance with an embodiment of the present invention.

FIG. 7 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application, or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components. Client computing devices 804, 806, and 808 may be devices similar to those described above for FIG. 6. Although system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols. Cloud infrastructure system 802 may comprise one or more computers and/or servers.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner.

In various embodiments, cloud infrastructure system 802 may be adapted to automatically provision, manage and track a customer's subscription to services offered by cloud infrastructure system 802. Cloud infrastructure system 802 may provide the cloudservices via different deployment models. For example, services may be provided under a public cloud model in which cloud infrastructure system 802 is owned by an organization selling cloud services and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services, and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloudservices may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816. At operation 836, the order is stored in order database 818. Order database 818 can be one of several databases operated by cloud infrastructure system 818 and operated in conjunction with other system elements. At operation 838, the order information is forwarded to an order management module 820. In some instances, order management module 820 may be configured to perform billing and accounting functions related to the order, such as verifying the order, and upon verification, booking the order. At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of business processes associated with each order and applies business logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 802 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 802 may include an identity management module 828. Identity management module 828 may be configured to provide identity services, such as access management and authorization services in cloud infrastructure system 802. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense. In addition, an illustrated embodiment need not have all the aspects or advantages shown. An aspect or an advantage described in conjunction with a particular embodiment is not necessarily limited to that embodiment and can be practiced in any other embodiments even if not so illustrated. Also, reference throughout this specification to "some embodiments" or "other embodiments" means that a particular feature, structure, material, or characteristic described in connection with the embodiments is included in at least one embodiment. Thus, the appearances of the phrase "in some embodiment" or "in other embodiments" in various places throughout this specification are not necessarily referring to the same embodiment or embodiments.

What is claimed is:

1. A method for implementing change logs in a database system, comprising:
    maintaining a first change log structure in non-volatile memory and a second change log structure in volatile memory;
    performing, on a transaction-basis, a determination as to whether to assign a transaction to the volatile memory or to the non-volatile memory;
    executing a first transaction at least by placing a first redo record for the first transaction into the first change log structure and further by placing a placeholder entry corresponding to the first redo record in the volatile memory, wherein the determination is to assign the first transaction to the non-volatile memory;
    executing a second transaction at least by placing a second redo record in the second change log structure, wherein the determination is to assign the second transaction to the volatile memory; and
    committing the first transaction without waiting for the first redo record to be copied to a persistent storage device.

2. The method of claim 1, wherein the first change log structure in the non-volatile memory comprises a set of individual private strands, the set of individual private strands including a specific private strand allocated to the first transaction to hold the first redo record, the specific private strand corresponds to a metadata record that is marked to indicate commit of the second transaction.

3. The method of claim 1, further comprising:
    identifying a third transaction to commit, the second transaction being later in time as compared to the first or the second transaction;
    adding one or more redo records for the third transaction to the second log structure in the volatile memory;
    prior to committing the third transaction, copying the first redo record for the first transaction from the first change log structure in the non-volatile memory to the second log structure in the volatile memory; and
    committing the third transaction, wherein redo records placed into the second log structure in the volatile memory are copied to the persistent storage device, the redo records copied to the persistent storage device include the first redo record for the first transaction as well as the one or more redo records for the third transaction.

4. The method of claim 1, wherein a dependency tracking structure is maintained to track one or more dependencies for the second transaction, and dependent redo records that are dependent upon by the second transaction are flushed to the persistent storage device before committing the second transaction.

5. The method of claim 1, wherein memory space occupied by the first redo record in the non-volatile memory is freed after copying the first redo record to the persistent storage device.

6. A system for implementing change logs in a database system, comprising:
    a processor;
    a memory for holding programmable code, wherein the programmable code includes instructions which, when executed by the processor, cause the processor to perform a set of acts, the set of acts comprising:
    maintaining a first change log structure in non-volatile memory and a second change log structure in volatile memory;
    performing, on a transaction-basis, a determination as to whether to assign a transaction to the volatile memory or to the non-volatile memory;
    executing a first transaction at least by placing a first redo record for the first transaction into the first change log structure and further by placing a placeholder entry corresponding to the first redo record in the volatile memory, wherein the determination is to assign the first transaction to the non-volatile memory;
    executing a second transaction at least by placing a second redo record in the second change log structure, wherein the determination is to assign the second transaction to the volatile memory; and
    committing the first transaction without waiting for the first redo record to be copied to a persistent storage device.

7. The system of claim 6, wherein the first change log structure in the non-volatile memory comprises a set of individual private strands, the set of individual private strands including a specific private strand allocated to the first transaction to hold the first redo record, the specific private strand corresponds to a metadata record that is marked to indicate commit of the second transaction.

8. The system of claim 6, wherein the programmable code includes further the instructions executable by the processor for:
    identifying a third transaction to commit, the second transaction being later in time as compared to the first or the second transaction;
    prior to committing the third transaction, copying the first redo record for the first transaction from the first change log structure in the non-volatile memory to the second log structure in the volatile memory;

adding one or more redo records for the third transaction to the second log structure in the volatile memory; and committing the third transaction, wherein redo records placed into the second log structure in the volatile memory are copied to the persistent storage device, the redo records copied to the persistent storage device include the first redo record for the first transaction as well as the one or more log redo records for the third transaction.

9. The system of claim 6, wherein a dependency tracking structure is maintained to track one or more dependencies for the second transaction, and dependent redo records that are dependent upon by the second transaction are flushed to the persistent storage device before committing the second transaction.

10. The system of claim 6, wherein memory space occupied by the first redo record in the non-volatile memory is freed after copying the first redo record to the persistent storage device.

11. A computer program product embodied on a non-transitory computer readable medium having stored thereon a sequence of instructions which, when executed by a processor, causes the processor to execute a set of acts for implementing change logs in a database system, the set of acts comprising:

maintaining a first change log structure in non-volatile memory and a second change log structure in volatile memory;

performing, on a transaction-basis, a determination as to whether to assign a transaction to the volatile memory or to the non-volatile memory;

executing a first transaction at least by placing a first redo record for the first transaction into the first change log structure and further by placing a placeholder entry corresponding to the first redo record in the volatile memory, wherein the determination is to assign the first transaction to the non-volatile memory;

executing a second transaction at least by placing a second redo record in the second change log structure, wherein the determination is to assign the second transaction to the volatile memory; and committing the first transaction without waiting for the first redo record to be copied to a persistent storage device.

12. The computer program product of claim 11, wherein the first change log structure in the non-volatile memory comprises a set of individual private strands, the set of individual private strands including a specific private strand allocated to the first transaction to hold the first redo record, the specific private strand corresponds to a metadata record that is marked to indicate commit of the second transaction.

13. The computer program product of claim 11, wherein the non-transitory computer readable medium includes further instructions executable by the processor for:

identifying a third transaction to commit, the second transaction being later in time as compared to the first or the second transaction;

prior to committing the third transaction, copying the first redo record for the first transaction from the first change log structure in the non-volatile memory to the second log structure in the volatile memory;

adding one or more redo records for the third transaction to the second log structure in the volatile memory; and committing the third transaction, wherein redo records placed into the second log structure in the volatile memory are copied to the persistent storage device, the redo records copied to the persistent storage device include the first redo record for the first transaction as well as the one or more log redo records for the third transaction.

14. The computer program product of claim 11, wherein a dependency tracking structure is maintained to track one or more dependencies for the second transaction, and dependent redo records that are dependent upon by the second transaction are flushed to the persistent storage device before committing the second transaction.

15. The computer program product of claim 11, wherein memory space occupied by the first redo record in the non-volatile memory is freed after copying the first redo record to the persistent storage device.

16. A method for recovering after a failure in a database system, comprising:

bringing up a previously-failed computing node;

scanning a change log structure in non-volatile memory to identify one or more committed transactions corresponding to redo records stored in the change log structure in the non-volatile memory;

analyzing a redo stream on a persistent storage device;

determining whether any of the redo records in the change log structure in the non-volatile memory do not exist in the redo stream in the persistent storage device;

copying identified redo records into the redo stream on the persistent storage device, the identified redo records corresponding to the redo records that were previously identified as existing in the change log structure in the non-volatile memory for the one or more committed transaction that do not exist in the redo stream in the persistent storage device; and recovering the previously-failed computing node by applying the redo stream in the persistent storage.

17. The method of claim 16, wherein the change log structure in the non-volatile memory includes a set of private strands and a set of metadata, the set of private strands holding the redo records, the set of metadata including data that indicates whether a transaction associated with the redo records has committed, and the act of scanning the change log structure in the non-volatile memory to identify the one or more committed transactions is performed by reviewing the set of metadata to determine which transactions are associated with metadata having the data that indicates transaction commitment.

* * * * *